United States Patent [19]

Rancourt et al.

[11] Patent Number: 5,770,852
[45] Date of Patent: Jun. 23, 1998

[54] PLATE SCANNING DEVICE HAVING LIGHT FUNNELS WITH AN ADJUSTABLE APERTURE

[75] Inventors: Michael R. Rancourt, Merrimack; Gerald J. Drew, New Durham, both of N.H.

[73] Assignees: Heidelberger Druckmaschinen AG, Heidelberg, Germany; Heidelberger Harris, Inc., Dover, N.H.

[21] Appl. No.: 705,437

[22] Filed: Aug. 29, 1996

[51] Int. Cl.[6] .................................................. H01J 40/14
[52] U.S. Cl. ............................... 250/208.2; 250/227.29; 250/216
[58] Field of Search .......................... 250/208.2, 208.1, 250/208.3, 227.29, 227.3, 216, 234, 239; 362/16, 18; 355/113

[56] References Cited

U.S. PATENT DOCUMENTS

| | | | |
|---|---|---|---|
| 4,512,662 | 4/1985 | Tobias | 356/429 |
| 5,038,028 | 8/1991 | Boyd et al. | 250/208.1 |
| 5,170,711 | 12/1992 | Maier et al. | |

*Primary Examiner*—Que Le
*Attorney, Agent, or Firm*—Kenyon & Kenyon

[57] ABSTRACT

A plate scanning device for measuring diffused or reflected light is provided. The plate scanning device includes a longitudinally extending silicon sensor strip and at least one light source extending substantially parallel to the sensor strip. Adjustably mounted light funnels form an aperture therebetween for receiving light reflected from a printing plate. The aperture has a width and length which is slightly smaller than a width and length of the sensor strip.

16 Claims, 5 Drawing Sheets

PLATE SCANNING DEVICE HAVING LIGHT FUNNELS WITH AN ADJUSTABLE APERTURE

FIELD OF THE INVENTION

The present invention relates to a plate scanner for a printing press.

BACKGROUND OF THE INVENTION

U.S. Pat. No. 4,512,662 purports to disclose a plate scanner for printing plates. An arrangement and a method to scan a printing plate and to determine the ratio of areas which will carry ink, during the printing process, to areas which will not carry ink, during the printing process, is discussed. Adjusting means at various stations along an ink reservoir can be properly set in order to effect correct ink flow in those various stations.

U.S. Pat. No. 5,170,711 purports to show a method and an apparatus for ink control and zonal presetting. The values ascertained from printer's copies for ink-zone presetting are supplied to an ink supply detection computer via a film/plate scanner. Before the various scanning areas in accordance with scanning patterns are summed up, the zonal preset values ascertained by the ink supply detection computer undergo a correction in accordance with the value furnished by a weighting computer for each scanning area. This purportedly optimizes the presetting of the ink zones. As a function of the corrected values taking the subject to be printed into account, ductor rollers and rubber rollers can be controlled, in order to improve the ink penetration as a function of the subject in circumferential direction as well.

SUMMARY OF THE INVENTION

Plate scanners generally utilize either photo diodes or individual sensor cells arranged in groups to scan printing plates. One disadvantage of photo diode designs is that they require an optical lens to allow the sensing system to receive light diffused or reflected from the printing plate. However, through non-linearities in the light intensity, the lens can cause imperfections. In contrast, designs using individual sensor cells arranged in groups are generally deficient because gaps are formed in those regions where the cells are joined. Since light cannot be detected in these gaps, the likelihood of loss of data in those regions increases considerably. In high-precision measurements, such a data loss is unacceptable.

In accordance with the present invention, a plate scanning device for scanning a plate of a printing press includes a longitudinally extending continuous sensor strip and at least one light source extending substantially parallel to the sensor strip. A pair of light funnels form an aperture for receiving reflected light and the size of the aperture is slightly smaller than the size of the sensor strip. A printing plate to be scanned is arranged below the aperture.

In accordance with a first embodiment of the present invention, the sensor strip is formed as an array of individual sensor cells which are integrated onto a single continuous strip. The sensor cells are packed closely together on the single continuous strip so that gaps between the sensor cells are substantially reduced as compared to prior art plate scanners. Since there is virtually no gap or rim between the sensor cells, the problem of lost data is eliminated because the slight gap remaining between sensor cells results in only a negligible loss of data. The continuous sensor strip thereby significantly enhances the performance of the scanning device. In accordance with a preferred embodiment of the present invention, the gap between sensor cells is less than or equal to 0.005 inches.

Since the size of the aperture between the light funnels is slightly smaller than the size of the sensor strip, the entire area beneath the aperture can be scanned, thereby minimizing loss of information during scanning and increasing the effectiveness of the scanning operation. In addition, this arrangement prevents diffuse light from outside the desired scanning area from reflecting onto the sensor strip. The components of the scanning device according to the present invention, including the continuous sensing strip, the light funnels, and the light sources, are mounted within a carriage which is movable across the surface of the printing plate. In accordance with a preferred embodiment of the present invention, the sensor strip and aperture have a length which is equal to or greater than the width (or length) of the image carrying surface of the printing plate, and the scanning device is movable across the length (or width) of the printing plate. As set forth above, the length and width of the aperture is slightly smaller than the length and width of the sensor strip. In this manner, the entire surface of the printing plate can be scanned in a single pass over the plate without loss of data.

If the sensor strip is formed as a plurality of sensor cells integrated on a continuous strip, a plurality of sensors can be serially connected to an amplifying circuit. For example, if the sensor strip includes 24 sensors, four amplifier circuits could be provided, with each amplifier circuit connected to a respective group of six serially connected sensor cells. In accordance with an embodiment of the invention, the amplifying circuit includes a transimpedance amplifier which converts a variable current received from the sensors into a variable voltage. Each amplifier circuit may further include a variable resistor for adjusting the gain of the amplifier circuit. Moreover, each amplifier circuit may include bypass capacitors to bypass noise introduced on the power supply lines.

In accordance with a further embodiment of the present invention, in order to ensure an accurate beam path of the light reflected from the surface of the printing plate, the light funnels assigned to the light sources include adjustably mounted lower wall portions. The aperture between the light funnels is formed by the opposing lower wall portions of the funnels. In addition, upper wall portions of the funnels are shaped to guard the sensing strip from dissipated light from the light sources. By adjusting the position of the lower wall portions, the size of the aperture can be adjusted to be slightly smaller than the size of the sensor strip. With this construction, the path of the beam of light reflected from the printing plate's surface will extend substantially in a vertical direction. Moreover, since the lower wall portions are adjustable, the size of the aperture can be adjusted in order to fine tune the direction of the beam of light.

DETAILED DESCRIPTION OF THE INVENTION

Figure 1:
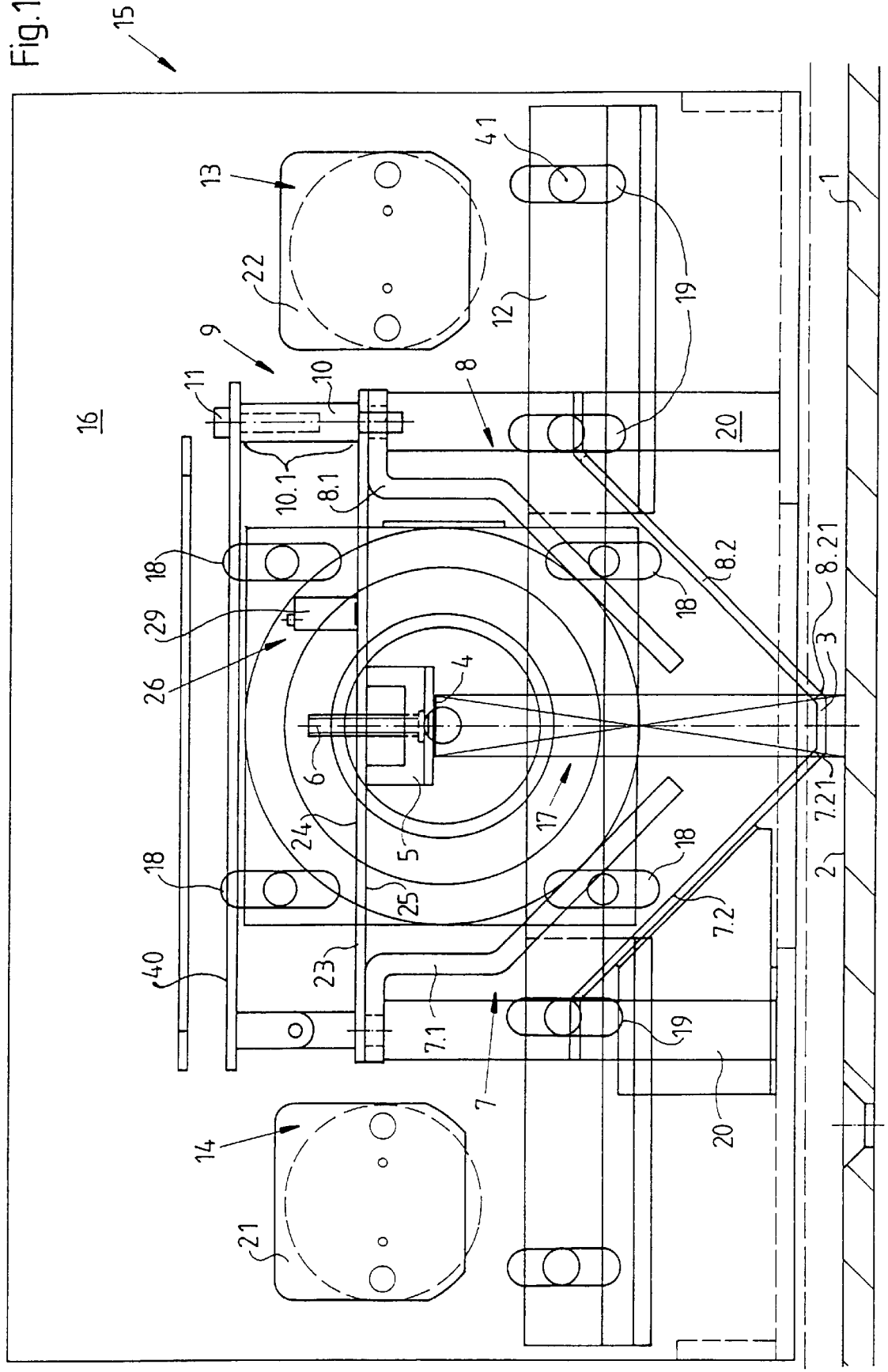
FIG. 1 shows a cross-section of a scanning device according to the present invention.

FIG. 1 shows a cross-section of a plate scanning device according to the present invention arranged above a printing plate 1 to be scanned. The printing plate has a flat plate surface 2 which includes an image to be scanned.

The plate scanning device according to the present invention is mounted within a carriage 15 having a side wall 16. A sensing strip support 5 is mounted by a fastener 6, such as a screw or the like, on a support plate 23. The sensing strip support 5 supports a continuous sensing strip 4 which extends over the width (or length) of the printing plate 1 to be scanned. Substantially parallel to the continuous sensing strip 4 there are arranged two light funnels, a left light funnel 7 and a right light funnel 8. A respective light source 13, 14 is assigned to each of the light funnels 7, 8.

The left and right light funnels 7 and 8, each include a respective upper wall portion 7.1 and 8.1 mounted on a support 20. Each light funnel 7, 8 also includes a respective lower wall portion 7.2, 8.2 which can be adjustably mounted to the support 20. An aperture 3 is formed between the lower ends 7.21, 8.21 of the lower wall portions 7.2 and 8.2, respectively. By adjusting the size of the aperture 3, via the adjustably mounted lower wall portions 7.2, 8.2, the area from which light is to be sensed can be adjusted to be slightly smaller than the physical size of the continuous sensing strip 4. Thus, a light-beam path 17 of light reflected from the flat surface 2 extends substantially in a vertical direction as shown. Since the light-beam path 17 between the surface of the continuous sensing strip 4 and the surface 2 of the plate to be scanned is substantially vertical, little or no loss of information due to light deviations will occur.

The continuous sensing strip 4 includes a plurality of sensor cells integrated onto a continuous strip and arranged close to one another so as to virtually eliminate the gaps between them. Preferably, the sensor cells are arranged having a distance therebetween of approximately 0.001 to 0.005 inches. In this manner, the array of sensors detecting data from the surface 2 can be enlarged significantly, providing for scanning with increased resolution, and with virtually no loss of information due to gaps or rims between sensor cells.

In accordance with a further embodiment of the present invention, the continuous sensing strip could comprise a continuous strip of silicon having a plurality of sensor cells impregnated thereon. In this embodiment, the distance between sensor cells is even further reduced because the sensor cells are formed directly within the continuous strip of silicon.

The upper wall portions 7.1, 8.1 of the light funnels 7, 8 are respectively mounted on supports 20 within the carriage 15. The wall portions 7.1, 8.1 are shaped so as to shield the continuous sensing strip 4 from light dissipated from the light sources 13, 14. Spacing elements 10, supporting a cover 40 which is fastened to the spacing elements 10 by bolts 11, are mounted above the upper wall portions 7.1, 8.1. A gap 10.1 is thereby created between the cover 40 and the upper wall portions 7.1, 8.1.

Within the carriage 15 there are respectively mounted contact plates 21, 22 which support the light sources 13, 14. The carriage 15 includes horizontally extending bars 12 which include an adjusting mechanism for adjusting the vertical position of the scanning device relative to the printing plate 1. The adjusting mechanism includes bolts 41 which are movable within adjusting slots 18, 19. By means of a clamping mechanism, such as bolts 41, the relative position between the scanning device mounted in the carriage 15 and the surface 2 of the plate 1 can be adjusted. As mentioned above, the support 5 for the continuous sensing strip 4 is mounted on a lower surface 25 of the support plate 23. On the upper surface 24 of the support plate 23, there are arranged a plurality of amplifying circuits 26 (only one shown).

Figure 2:
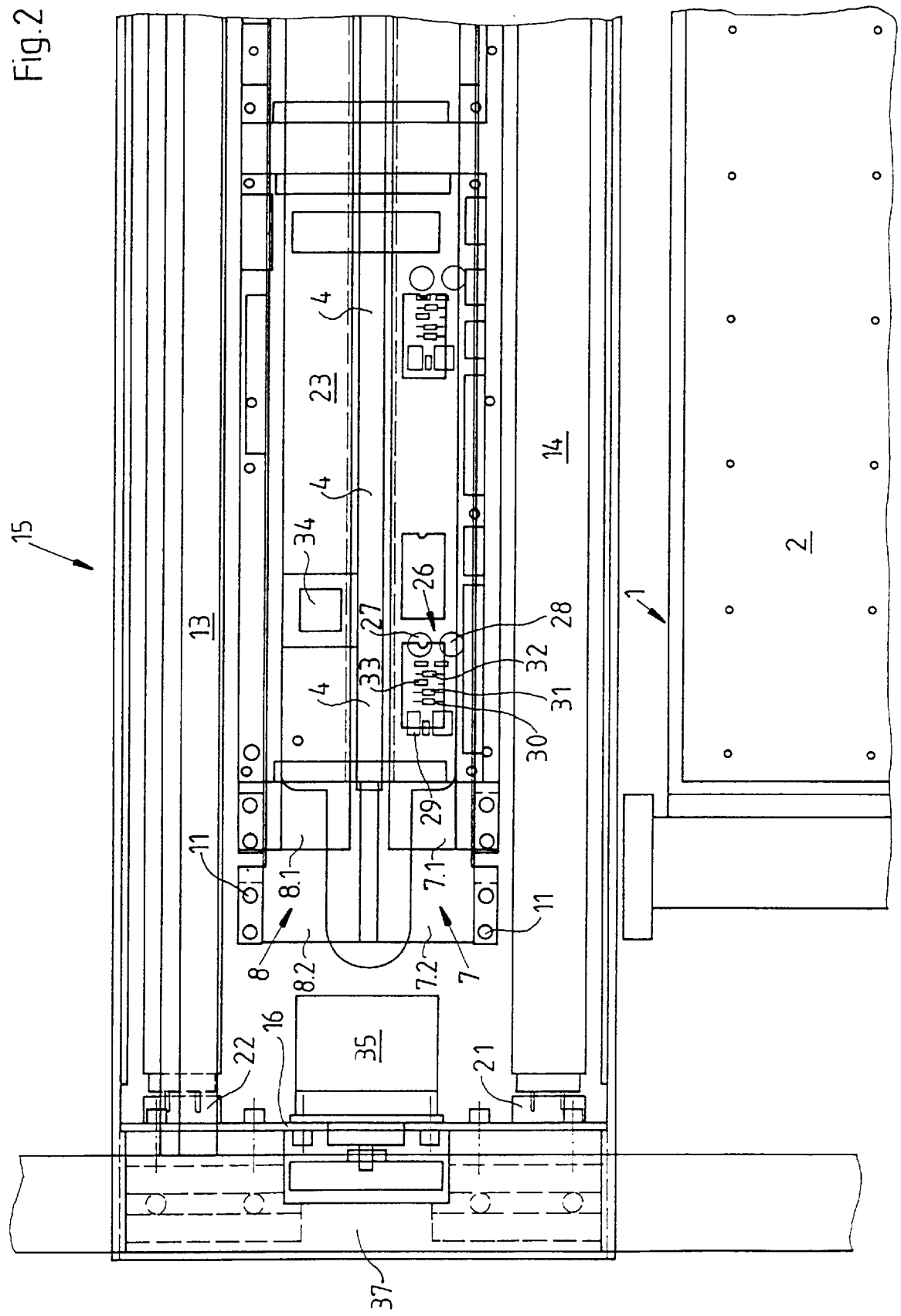
FIG. 2 shows a top view of the scanning device according to the present invention.

FIG. 2 shows a top view of the scanning device according to the present invention. The upper wall portions 7.1, 8.1 of the funnels 7, 8 are shown arranged over the lower wall portions 7.2, 8.2 forming the aperture 3 therebetween (not shown). Within the carriage 15, which is movable across the surface 2 of the printing plate 1, the light sources 13, 14 extend substantially parallel to the continuous sensing strip 4. The continuous sensing strip 4 is mounted below support plate 23, and the amplifying circuits 26 are mounted in spaced relation above the support plate 23. As shown in greater detail in FIG. 4, the amplifying circuits 26 include a pair of amplifiers 29.1, 29.2, resistors 30, 31 and 32, and bypass capacitors 27, 28. As illustrated in FIG. 2, a central processing unit 34 is coupled to the amplifying circuits 26 which extend along the continuous sensing strip 4. Below the continuous sensing strip 4 there are arranged the left and right light funnels 7, 8, respectively. In accordance with a preferred embodiment of the invention, a plurality of sensor cells can be serially connected to each amplifying circuit 26. Referring to FIG. 5, if the sensor strip 4 includes 24 sensor cells 400.1 through 400.24, sensor cells 400.1 through 400.6 could be serially connected to a first amplifying circuit 26.1, sensor cells 400.7 through 400.12 (not shown) could be serially connected to a second amplifying circuit 26.2, sensor cells 400.13 through 400.18 (not shown) could be serially connected to a third amplifying circuit 26.3, and sensor cells 400.19 through 400.24 (not shown) could be serially connected to a fourth amplifying circuit 26.4. Alternatively, if higher resolution is desired, each sensor cell 400 could be connected to a corresponding amplifying circuit 26.

Figure 3:
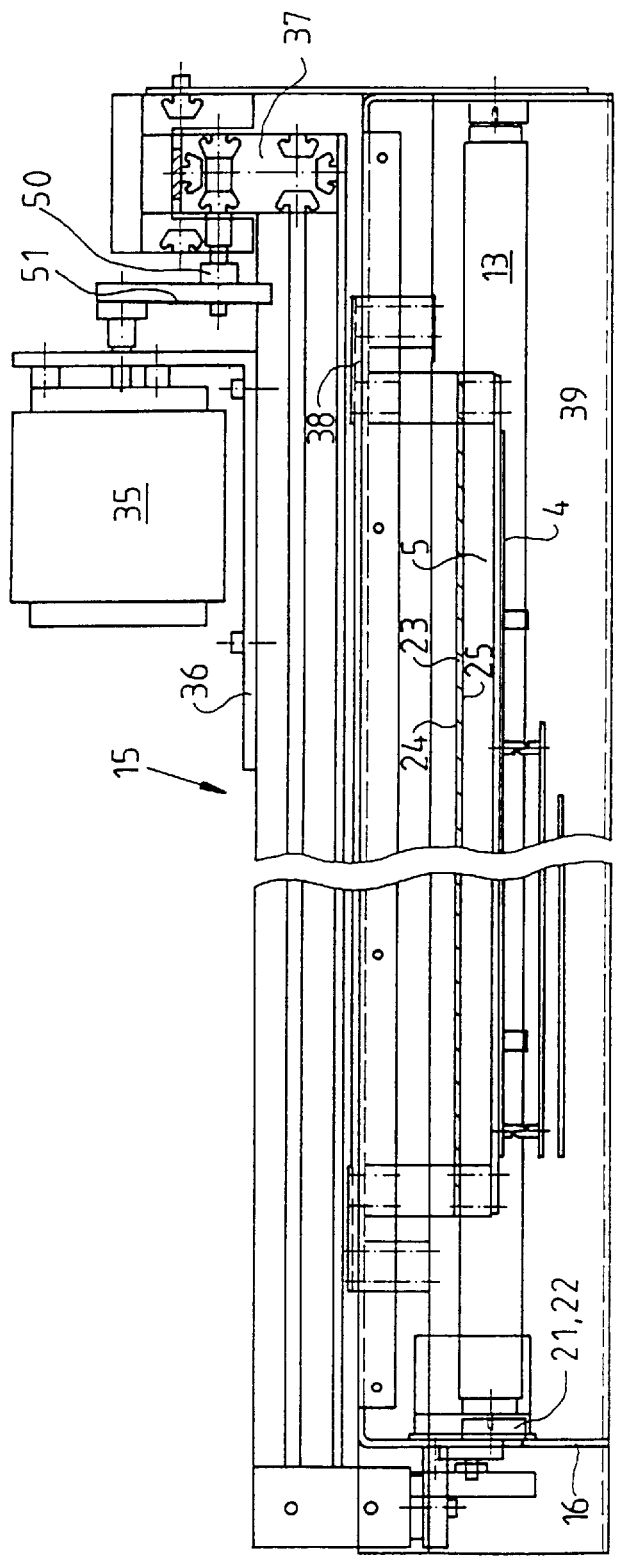
FIG. 3 shows a side view of a carriage in which the components of the scanning device are mounted.

FIG. 3 shows a side view of the carriage 15 of the scanning device. A drive 35 is mounted to the carriage 15 via a drive support 36. The carriage 15 is driven along a guide track 37 via a drive wheel 50, which is connected to the drive 35 via a belt 51. Within the carriage 15, the light sources 13, 14 are attached to contact plates 21, 22 which are fastened to the side walls 16 of the carriage 15. Respective mounting bars 38, 39 for supporting the upper and lower wall portions 7.1, 8.1, 7.2, 8.2 (not shown) extend across the carriage 15. The mounting bar 39 further supports the support plate 23. The sensor support 5 is mounted to the lower side 25 of support plate 23. The continuous sensor strip 4 is attached to the lower side of the sensor support 5.

Figure 4:
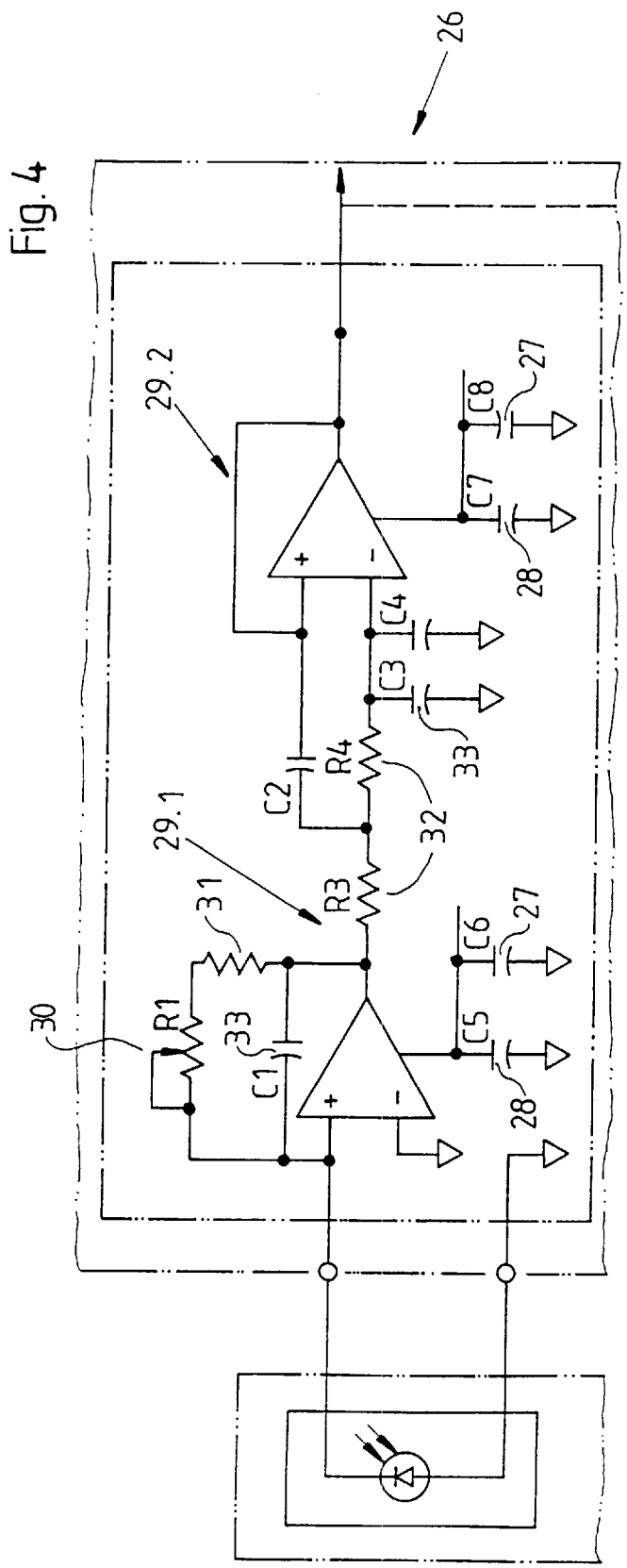
FIG. 4 shows the components of an amplifying circuit according to the present invention.
Figure 5:
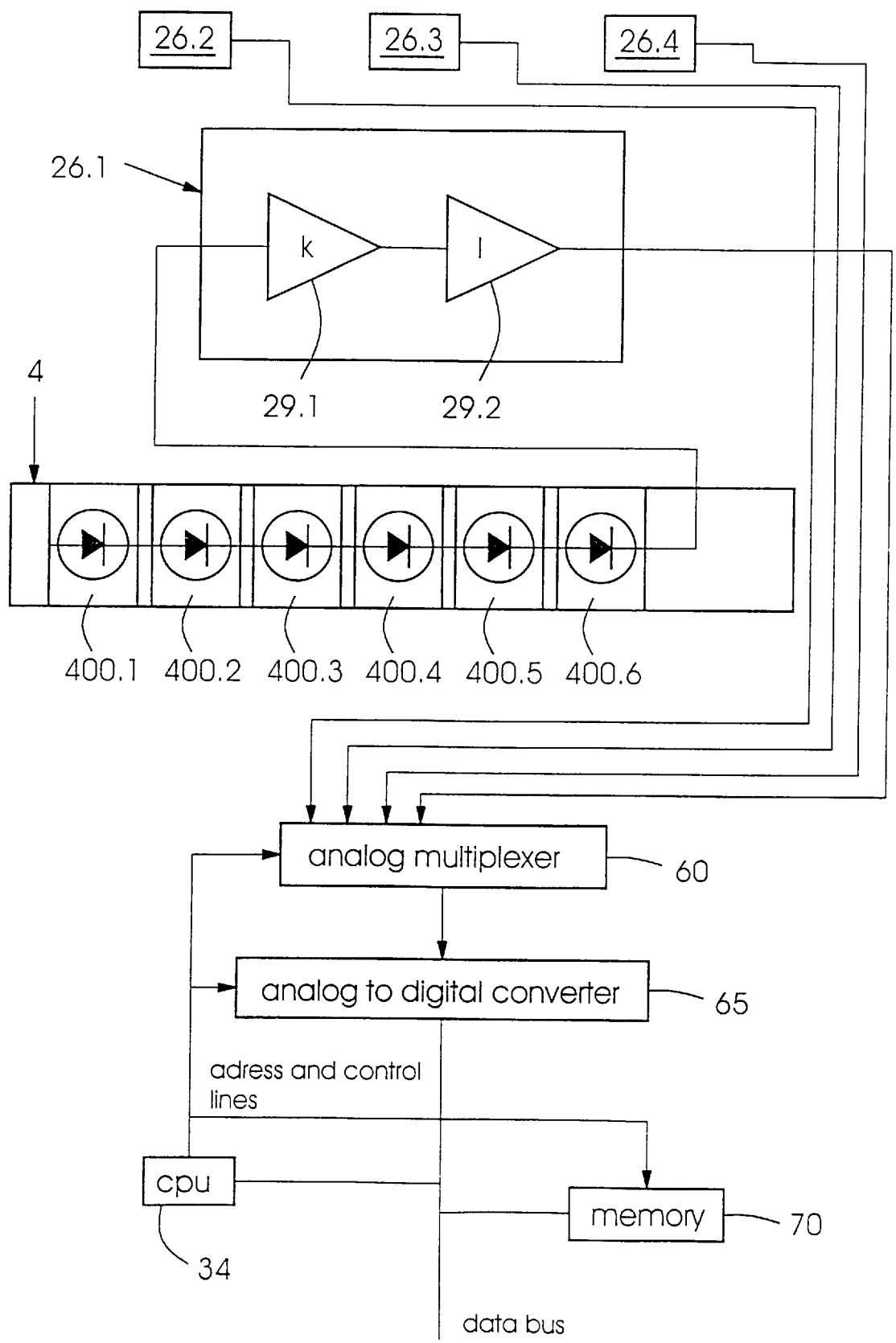
FIG. 5 shows an illustrative processing circuit according to the present invention.

FIG. 4 shows the components of one of the amplifying circuits 26. In accordance with a further embodiment of the present invention, each amplifying circuit 26 includes a first operational amplifier 29.1 and a second operational amplifier 29.2. The first amplifier 29.1 is configured as a transimpedance amplifier which converts a variable current to a variable voltage. The gain of the amplifier 29.1 is $KV_{out}/I_{in}$, where $I_{in}$ is the current from the sensor, $V_{out}$ is the voltage output from the amplifier 29.1, and K is a constant which is a function of the value of the resistors 30, 31. In accordance with a further embodiment of the present invention, the resistor 30 is a variable resistor so that the gain for the amplifier 29.1 can be calibrated during setup. The amplifier operates over four decades with an output of 1mV at minimum current from the sensing strip to 10 volts at maximum current from the sensing strip. The second amplifier 29.2 is configured as a voltage follower with a gain of 1. The resistance of the resistor 31 is set to a value which provides a 10 volt output from the voltage follower 29.2 at maximum current from the sensor strip 4. A capacitor C2 and a resistor R3 are used as a high frequency cut-off to the inverting input of the voltage follower. Capacitors C3 and C4 respectively, are bypass capacitors which are placed on the non inverting input of the voltage follower to pass high frequencies to ground. The output of the amplifier circuit 26 is a voltage scaled to represent the coverage seen by the sensor circuit on the lithographic plate. The usable voltage range from the amplifier is 1 mv to 10 v (four decades of range). 0 V from the amplifier corresponds to 100% coverage. 0% coverage is referenced to its corresponding voltage on a per plate basis. A linear relationship is maintained per plate between 0% and 100% coverage.

Referring to FIG. 5, the output voltage from the amplifier 26 is coupled to the CPU 34 via an analog to digital converter 65. The analog to digital converter 65 can be of any known construction and converts an analog voltage to a digital value. For example, if a 12 bit analog to digital converter is used, the analog voltage from the amplifier 26 will be converted to a digital value from 0–4096. The CPU 34 reads the digital value from the analog to digital converter 65 and stores it in a memory 70. The data stored in the memory 70 can later be transferred to a remote computer through a serial bus interface where it is stored for later use in presetting ink key actuators on the press.

Specifically, in the embodiment shown in FIG. 5, six sensor cells are connected to each amplifier circuit 26. The amplifier circuits 26.1 through 26.4 are coupled to an analog multiplexer 60 which, in turn, is coupled to the analog to digital converter 65. The CPU 34 controls the analog multiplexer 60 to apply the output of the amplifier 26.1 to the analog to digital converter 65, and then controls the analog to digital converter 65 to convert the signal received from the analog multiplexer into a digital value, and to place the digital value onto the data bus for storage in memory 70. This procedure is then repeated for the remaining amplifier circuits 26.2 through 26.4. The analog multiplexer 60, analog to digital converter 65, and memory 70 are controlled in a conventional manner via the address and control lines of the CPU 34. The data stored in the memory 70 can later be transferred to a remote computer through a serial bus interface where it is stored for later use in presetting ink key actuators on the press.

Naturally, the CPU arrangement of FIG. 5 is merely illustrative. For example, it is possible to provide a respective analog to digital converter 65 for each of the amplifier circuits 26 and thereby eliminate the need for the analog multiplexer. Similarly, it is possible to provide a respective amplifier circuit 26 for each sensor cell 400. Moreover, separate processors could be provided for processing the data received from the analog to digital converter and for transferring the data from memory to the remote computer.

What is claimed is:

1. A plate scanning device, comprising
    a longitudinally extending continuous sensing strip;
    at least one light source extending substantially parallel to the sensing strip;
    first and second adjustably mounted light funnels forming an aperture therebetween for receiving light reflected from a printing plate, the aperture having a width and length which is smaller than a width and length of the sensing strip.

2. The plate scanning device according to claim 1, wherein the continuous sensing strip includes a first plurality of sensor cells integrated onto the continuous sensing strip.

3. The plate scanning device according to claim 2, wherein a distance between adjacent ones of the first plurality of sensor cells is less than or equal to 0.005 inches .

4. The plate scanning device according to claim 1, wherein the continuous sensing strip is a continuous strip of silicon having a first plurality of sensor cells formed thereon.

5. The plate scanning device according to claim 2, further comprising a second plurality of amplifier circuits, each of the second plurality of amplifier circuits connected to at least one of the first plurality of sensor cells.

6. The plate scanning device according to claim 5, wherein the first plurality of sensor cells includes a second plurality of serially connected sensor cell sets, each of the second plurality of amplifier circuits coupled to a respective one of the second plurality of serially connected sensor cell sets.

7. The plate scanning device according to claim 5, wherein each of the second plurality of amplifier circuits includes a transimpedance amplifier.

8. The plate scanning device according to claim 1, wherein the first light funnel includes a first adjustably mounted wall portion and wherein the second light funnel includes a second adjustably mounted wall portion.

9. The plate scanning device according to claim 8, wherein each of the first and second adjustably mounted wall portions further includes an upper wall portion and an adjustable lower wall portion, the aperture being formed between the adjustable lower wall portion of the first adjustably mounted wall portion and the adjustable lower wall portion of the second adjustably mounted wall portion.

10. The plate scanning device according to claim 9, wherein the each of the upper wall portions shield the continuous sensing strip from dissipated light of the light sources.

11. The plate scanning device according to claim 6, wherein each of the second plurality of serially connected sensor cell sets includes six sensor cells.

12. The plate scanning device according to claim 1, wherein a light beam path between a surface of the printing plate and the continuous sensor strip extends substantially in a vertical direction.

13. The plate scanning device according to claim 8, wherein each of the first and second adjustably mounted wall portions further includes an upper wall portion and an adjustable lower wall portion, the aperture being formed between the adjustable lower wall portion of the first adjustably mounted wall portion and the adjustable lower wall portion of the second adjustably mounted wall portion, the adjustable lower wall portions being movable to adjust a light beam path between a surface of the printing plate and the continuous sensor strip into a substantially vertical direction.

14. The plate scanning device according to claim 1, further including a carriage which is movable across a surface of the printing plate, the continuous sensing strip, the funnels, and the light sources being mounted within the carriage.

15. A device for scanning a printing plate comprising:
    a carriage which is movable across a surface of a printing plate;
    a scanning device mounted within the carriage, the scanning device including:
        a continuous sensing strip having a length and a width, the sensing strip having a plurality of sensor cells arranged thereon, adjacent ones of the plurality of sensor cells being spaced apart by a predetermined distance sufficient to minimize loss of significant data;

a first light funnel and a second light funnel forming an aperture therebetween, the aperture disposed vertically below the continuous sensing strip, the aperture having a length which is at least the length of the sensing strip, the aperture having a width which is smaller than the width of the sensing strip;

at least one light source, the light source providing light to the first and second light funnels, the light from the light source exiting the first and second funnels, reflecting off of the printing plate, and forming a substantially vertical light beam path from the printing plate, through the aperture, and onto the sensing strip.

16. A plate scanning device comprising:

a continuous sensing strip having a length and a width, the sensing strip having a plurality of sensor cells arranged thereon, adjacent ones of the plurality of sensor cells being spaced apart by a predetermined distance sufficient to minimize loss of significant data;

a first light funnel and a second light funnel forming an aperture therebetween, the aperture disposed vertically below the continuous sensing strip, the aperture having a length which is at least the length of the sensing strip, the aperture having a width which is smaller than the width of the sensing strip;

at least one light source, the light source providing light to the first and second light funnels, the light from the light source exiting the first and second funnels, reflecting off of a printing plate, and forming a substantially vertical light beam path from the printing plate, through the aperture, and onto the sensing strip.

* * * * *